US006774875B2

(12) United States Patent
Tong et al.

(10) Patent No.: US 6,774,875 B2
(45) Date of Patent: Aug. 10, 2004

(54) METHOD FOR COMPENSATING LUMINANCE OF A PLASMA DISPLAY PANEL

(75) Inventors: Shu-Rong Tong, Kaohsiung (TW); Tu-Hao Tsai, Taichung (TW); Jih-Fon Huang, Jubei (TW)

(73) Assignee: AU Optronics Corp., Hsinchu (TW)

( * ) Notice: Subject to any disclaimer, the term of this patent is extended or adjusted under 35 U.S.C. 154(b) by 294 days.

(21) Appl. No.: 10/108,356

(22) Filed: Mar. 29, 2002

(65) Prior Publication Data

US 2002/0145575 A1 Oct. 10, 2002

(30) Foreign Application Priority Data

Apr. 4, 2001 (TW) ....................................... 90108205 A

(51) Int. Cl.[7] .............................................. G02F 1/1347

(52) U.S. Cl. ............................. 345/63; 345/37; 345/41; 345/72; 345/83; 345/88; 345/589; 345/591; 345/600; 345/601; 345/602; 345/605; 445/24

(58) Field of Search .............................. 345/37, 41, 63, 345/72, 83, 88, 589, 591, 600, 601, 602, 605; 445/24

(56) References Cited

U.S. PATENT DOCUMENTS 5,233,413 A * 8/1993 Fuchsberger ................ 358/518
6,188,454 B1 * 2/2001 Greene et al. ................ 349/74
2001/0041489 A1 * 11/2001 Takeuchi et al. .............. 445/24

* cited by examiner

*Primary Examiner*—Bipin Shalwala
*Assistant Examiner*—Vincent E. Kovalick
(74) *Attorney, Agent, or Firm*—Rabin & Berdo, P.C.

(57) ABSTRACT

A method for compensating luminance, suitable for use in a plasma display panel. The method includes the following steps. First, the luminance value of each pixel signal is read out. Then, the load of the pixel signal row is computed. The load is the number of pixel signal in the pixel signal row that the luminance value of the pixel signal is larger than a predetermined threshold luminance value. Then, a primary luminance compensation value is decided according to the load of the pixel signal row. A number of secondary luminance compensation values are decided according to the primary luminance compensation value. Afterwards, each pixel signal in the pixel signal row is performed luminance compensation sequentially. If the luminance value is larger than or equal to a low threshold luminance value, the luminance value is subtracted by the primary luminance compensation value. If the luminance value is less than the low threshold luminance value, the luminance value is subtracted by the corresponding secondary luminance compensation value. Finally, the compensated pixel signal row is outputted.

7 Claims, 6 Drawing Sheets

| load | primary luminance compensation value |
|---|---|
| 2200~2400 | 0 |
| 2000~2200 | 1 |
| ⋮ (decreasing) ⋮ | ⋮ (increasing) ⋮ |
| 0~200 | 10 |

FIG. 5

| primary luminance compensation value | luminance value | secondary luminance compensation value |
|---|---|---|
| 10 | 0~10 | 0 |
| | ⋮ (increasing) ⋮ | ⋮ (increasing) ⋮ |
| | 80~90 | 8 |
| | 90~100 | 9 |

FIG. 6

| primary luminance compensation value | luminance value | secondary luminance compensation value |
|---|---|---|
| 20 | 0~10 | 0 |
| | . . . . (increasing) . . . . | . . . . (increasing) . . . . |
| | 80~90 | 16 |
| | 90~100 | 18 |

FIG. 7

METHOD FOR COMPENSATING LUMINANCE OF A PLASMA DISPLAY PANEL

This application incorporates by reference of Taiwan application Ser. No. 090108205, filed on Apr. 4, 2001.

BACKGROUND OF THE INVENTION

1. Field of the Invention

This invention relates in general to a method for compensating luminance, and more particularly to a method for compensating luminance, and the method is suitable for use in a plasma display panel.

2. Description of Related Art

With the rapid development of the fabrication technology of the audio/video (A/V) device, it can be foreseen that people in the future will enjoy the audio and video service with much higher performance than now. Taking the displaying device as an example, the conventional cathode ray tube (CRT) displaying device has not only the disadvantages of large volume and the serious radiation issue, but also that the image at the brim region of the screen has very serious image contortion and distortion problem. Therefore, the conventional CRT displaying device certainly cannot satisfy the people who desire to enjoy the audio and video service with higher performance. When the high definition digital television (HDTV) system starts to operate and broadcast in the near future, the conventional CRT displaying device designed with the analog manner will be gradually thrown away. Instead, the plasma display panel (PDP), which has at least advantages of low radiation, low power consumption, and large displaying area but small volume, can be a very promising product to replace the CRT displaying device.

Referring to FIG. 1, it is a drawing, schematically illustrating a loading effect on a plasma display panel. The loading effect is a phenomenon that the luminance of a pixel is affected by the luminance of the other pixels which are in the same row with the pixel. The loading effect causes a difference between the actual luminance and the expected luminance of the pixel and the actual luminance is less than the expected luminance. As shown in FIG. 1, the panel includes three pixel rows 102, 104, and 105. The pixel row 102 includes pixel sub-rows 106 and 110, the pixel row 104 includes pixel sub-rows 108 and 112, and the pixel row 105 includes pixel sub-rows 109 and 113. The luminance of the pixel sub-row 106 is less than the pixel sub-row 108 and the luminance of the pixel sub-row 108 is less than the luminance of the pixel sub-row 109. In addition, each pixel of the sub-rows 110, 112, and 113 has the same pixel signal. Each pixel signal includes a luminance value to determine the luminance of the pixel. In theory, the luminance of pixel sub-rows 110, 112, and 113 should be the same. However, in practical, the pixel sub-rows 110, 112, and 113 have the individual luminance L110, L112, and L113, respectively. The relation among L110, L112, and L113 is L110>L112>L113. And the luminance of pixel sub-rows 110, 112, and 113 are all less than the expected luminance which is corresponded to the luminance value of the pixel signals. In other words, the luminance of the pixel is affected by the luminance of the other pixels in the same row which causes the actual luminance is less than the expected luminance of the pixel. If the luminance of the other pixels in the same row is larger, the difference between the actual luminance and the expected luminance of the pixel will be larger. This phenomenon is called the loading effect.

A frame data is composed of a number of pixel signal rows. A plasma display panel with a resolution of 800×600 is taken as an example, in which it means that the whole panel has 800 pixels for each row, and 600 pixels for each column. The frame data should include 600 pixel signal rows. Each pixel signal row has 800 pixel signals. Each pixel signal includes a luminance value. The luminance value of the pixel signal is represented by a eight-bit binary number. The range of the luminance value is from $(00000000)_2$ to $(11111111)_2$ represented by binary numbers or from 0 to 255 represented by decimal numbers. The larger the luminance value of the pixel signal is, the larger the luminance of the pixel which receives the pixel signal will be. The smallest value 0 corresponds to the full black luminance of the pixel and the largest value 255 corresponds to the full white luminance of the pixel respectively.

Referring to FIG. 2, it is a block diagram, schematically illustrating a conventional device for compensating luminance 200. The conventional device for compensating luminance 200 includes a field programmable gate array (FPGA) 202 and two memory devices 204 which are coupled to the FPGA 202 respectively. The conventional device for compensating luminance 200 can determine whether or not the luminance compensation is necessary to be performed. If performing luminance compensation is determined to be necessary, the device for compensating luminance 200 will perform luminance compensation on the pixel signal row.

Referring to FIG. 3, it is a flow chart, schematically illustrating the conventional luminance compensation method performed by the device for compensating luminance. The conventional method for compensating luminance of the plasma display panel is described in the following. First, in the step 302, the device for compensating luminance will sequentially read each pixel signal of the pixel signal row.

Then, in the following step 304, the device for compensating luminance computes the load of the pixel signal row. According to forgoing descriptions, if the luminance of the other pixels in the same row is larger, the actual luminance of the pixel will be less and the difference between the actual luminance and the expected luminance will be larger. Therefore, the degree of the loading effect is determined by the luminance of the pixel row. When the device for compensating luminance determines whether or not luminance compensation is necessary to be performed, the magnitude of the luminance value of each pixel signal in the pixel signal row is a factor for consideration. In the conventional method for compensating luminance, the load of the pixel signal row is defined as the number of pixel signals in the pixel signal row that the luminance value of the pixel signals is larger than the predetermined threshold luminance value. The magnitude of the load of the pixel signal row determines the degree of the loading effect of the pixel row in the plasma display panel. The device for compensating luminance computes the load of the pixel signal row by comparing luminance value of each pixel signal to the threshold luminance value. According to the forgoing descriptions, each luminance value is represented by a binary number of eight bits. The higher bit has more influence than the lower bit of the luminance value on the determination of the luminance of the pixel. Therefore, when comparing luminance value of each pixel signal with the threshold luminance value, only the highest-three-bit of the pixel signal is needed to be put into consideration. The highest-three-bit of the threshold luminance value is defined to be 101 in conventional luminance compensation method. If the highest-three-bit of the luminance value is larger than or equal to 101, the luminance value of this pixel signal is considered as the one to increase the degree of the loading effect. On the contrary, if the highest-three-bit of the luminance value is less than 101, the luminance value of this pixel signal is considered as the one not to increase the degree of the loading effect. The load of the pixel signal row is the number of the pixel signal in the pixel signal row that the luminance value of the pixel signals is larger than or equal to $(10100000)_2$.

Then, in the following step 306. If the load of the pixel signal row is larger than or equal to the predetermined threshold load, luminance compensation will be performed. If the load of the pixel signal row is less than the threshold load, luminance compensation will not be performed and the pixel signal row will be outputted directly form the device for compensating luminance.

If the load of the pixel signal row is larger than or equal to the threshold load, luminance compensation will be performed. In the step 308, the luminance compensation value is decided according to the load of the pixel signal row. Each load of the pixel signal row that the magnitude of the load is larger than the threshold load is corresponded to a luminance compensation value. A number of luminance compensation values are predetermined and stored in the form of look-up-table (LUT) in the device for compensating luminance. The proper luminance compensation value for the pixel signal row is decided by looking up the look-up-table for luminance compensation. All luminance compensation values in the look-up-table are arranged in a decreasing order according to the magnitude of the luminance compensation values. When performing luminance compensation, the device for compensating luminance will choose the luminance compensation value from the top of the look-up-table. The first luminance compensation value is the largest of all luminance compensation values in the look-up-table. After then, in the step 310, the luminance compensation value is added to the luminance value of each pixel signal in the pixel signal row so as to perform luminance compensation. The pixel signal row that the luminance value of each pixel signal is added with the luminance compensation value is defined as a compensated pixel signal row.

After performing luminance compensation, the magnitude of the luminance value of each pixel signal in the pixel signal row will be larger than the original luminance value and the pixel row which displays according to the compensated pixel signal row will be brighter than the pixel row which displays according to the original pixel signal row. Therefore, the purpose of compensating luminance can be achieved.

Then, in the following step 312, the device for compensating luminance will compute the load of the compensated pixel signal row. Afterwards, in the following step 314, the load of the compensated pixel signal row is compared with the load of the original pixel signal row to see whether they are the same or not. If the magnitude of the luminance compensation value is too large, the pixel row which displays according to the compensated pixel signal row will be much brighter than the other pixel row in the panel and It will affects the displaying performance of the panel. Therefore, the device for compensating luminance will compare the load of the compensated pixel signal row with the load of the original pixel signal row to see whether they are the same or not. If the magnitude of the load of the compensated pixel signal row and the original pixel signal row are the same, it is considered that the magnitude of the luminance compensation value is proper. If the load of the compensated pixel signal row is larger than the load of the original pixel signal row, it is considered that the magnitude of the luminance compensation value is too large and the device for compensating luminance will repeat the step 308, the next luminance compensation value is chosen from the look-up-table. Since the luminance compensation values in the look-up-table are arranged in decreasing order, the magnitude of the newly chosen luminance compensation value is less than the previously chosen luminance compensation value. Then, the step 310, 312, and 314 are repeated again until the load of the compensated pixel signal row is the same with the load of the original pixel signal row. It is considered that the magnitude of the luminance compensation value is proper and the displaying performance of the panel cannot be affected. At last, the step 316 is performed, in which the compensated pixel signal row is outputted from the device for compensating luminance and the conventional luminance compensation method is accomplished.

There are some disadvantages of the conventional method for compensating luminance. First, in conventional luminance compensation method, the threshold luminance value and the threshold load used to determine the load of the pixel signal row are fixed. And the magnitude and the order of all luminance compensation values in the look-up-table are also fixed. When performing luminance compensation, no matter how large the load of the pixel signal row is, the same look-up-table is used to decide the luminance compensation value. It is not taken into consideration that luminance compensation values of the look-up-table must be adjusted according to the magnitude of the pixel signal to achieve a better effect of luminance compensation.

Second, when luminance compensation is performed, the luminance value of each pixel signal belonging to the same pixel signal row is added with a luminance compensation value regardless of the magnitude of each pixel signal. Even though the smallest pixel signal 0 which cannot increase the degree of the loading effect is still added with the luminance compensation value. Therefore, the luminance of the whole panel will become larger after luminance compensation is performed. It affects the displaying performance of the panel because the full dark luminance cannot be displayed and the luminance contrast of the panel is reduced.

Third, the conventional method for compensating luminance is to directly add the luminance compensation value into the pixel signal. If the magnitude of the pixel signal in the pixel signal row is larger, the degree of the loading effect will become larger and the magnitude of the luminance compensation value should be larger to compensate the decreasing luminance of the pixel. However, since the magnitude of the pixel signal in the pixel signal row is large, it will be more difficult to add the large magnitude luminance compensation value into the pixel signal and the purpose of luminance compensation will be more difficult to achieve. For example, if there is one pixel signal which has the largest luminance value 255, luminance compensation cannot be performed on the pixel signal row no matter how large the load of the pixel signal row is.

Fourth, if there is one pixel signal that the luminance value of the pixel signal is $(10011111)_2$, the load of the compensated pixel signal row is always larger than the load of the original pixel signal row when performing luminance compensation. In other words, if there is one pixel signal that the luminance value of the pixel signal is $(10011111)_2$, luminance compensation will not able to be performed.

According to the foregoing descriptions, the conventional method for compensating luminance has several disadvantages as follows: first, the magnitude of the luminance compensation value cannot be adjusted according to the load of the pixel signal row. Second, the full dark luminance cannot be displayed and the luminance contrast of the panel is reduced. Third, if the load of the pixel signal row is larger, it is more difficult to perform luminance compensation. Fourth, if there is one pixel signal that the luminance value of the pixel signal is $(10011111)_2$, luminance compensation cannot be performed.

SUMMARY OF THE INVENTION

It is therefore an objective of the present invention to provide a method for compensating luminance, suitable for use in a plasma display panel, so as to achieve the following objectives: First, The magnitude of luminance compensation signal can be adjusted according to the load of the pixel signal row. Second, the full dark luminance can be displayed and the luminance contrast of the panel is not reduced after performing luminance compensation. Third, it will not occur that luminance compensation cannot be performed due to some specific situation.

According to the objectives of the present invention, it is provided a method for compensating luminance, suitable for use in a plasma display panel. The plasma display panel includes a device for compensating luminance to perform luminance compensation on the pixel signal row. The method for compensating luminance includes the following steps. First, each pixel signal in the pixel signal row is read out and stored. Then, the load of the pixel signal row is computed. The load is defined as the number of pixel signal in the pixel signal row that the luminance value of the pixel signal is larger than a predetermined threshold luminance value. Then, a primary luminance compensation value is decided according to the load of the pixel signal row. After that, a number of secondary luminance compensation signals are decided according to the primary luminance compensation value. Afterwards, luminance compensation is performed. If the luminance value of the pixel signal is larger than or equal to a predetermined low threshold luminance value, the pixel signal is subtracted by the primary luminance compensation value. Otherwise, the luminance value of the pixel signal is subtracted by a corresponding secondary luminance compensation value according to the magnitude of the luminance value. At last, the compensated pixel signal row is outputted.

BRIEF DESCRIPTION OF DRAWINGS

The invention can be more fully understood by reading the following detailed description of the preferred embodiments, with reference made to the accompanying drawings, wherein:

FIG. 5 is a predetermined look-up-table of the relation between the load of the pixel signal row and the corresponding primary luminance compensation signal;

FIG. 6 is a predetermined look-up-table of the relation between the pixel signal and the corresponding secondary luminance compensation values when the primary luminance compensation value is 10; and FIG. 7 is a predetermined look-up-table of the relation between the pixel signal and the corresponding secondary luminance compensation values when the primary luminance compensation value is 20.

DETAILED DESCRIPTION OF PREFERRED EMBODIMENTS

The feature of the present invention is that a number of luminance compensation values are determined according to the load of the pixel signal row. And luminance compensation is carried out by subtracting corresponding luminance compensation value form the luminance value of each pixel signal in the pixel signal row.

Figure 1:
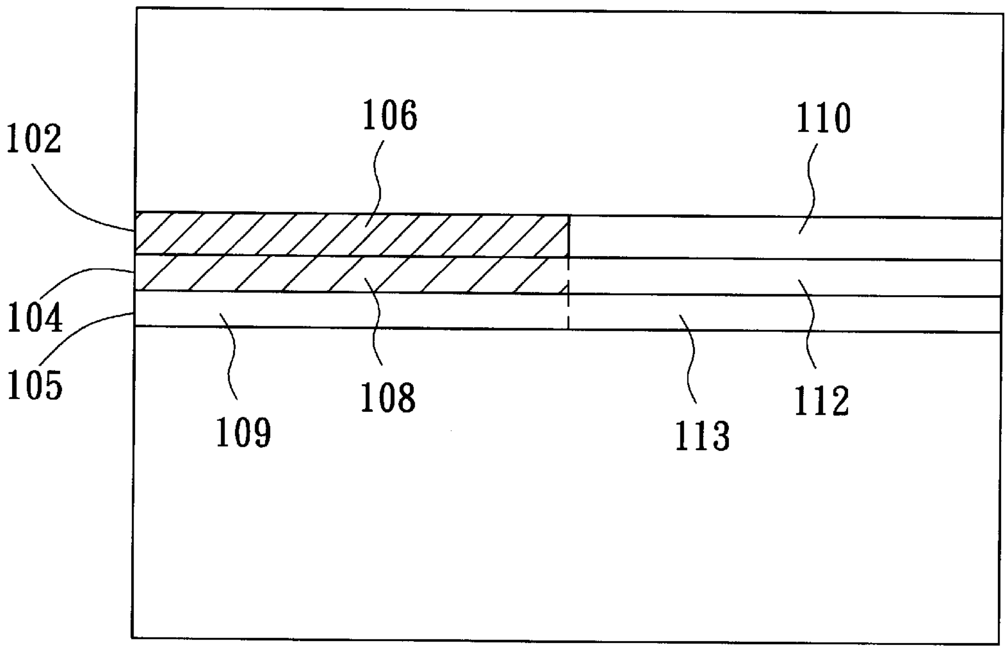
FIG. 1 (PRIOR ART)
FIG. 1 is a drawing, schematically illustrating a loading effect of a plasma display panel.
Figure 2:
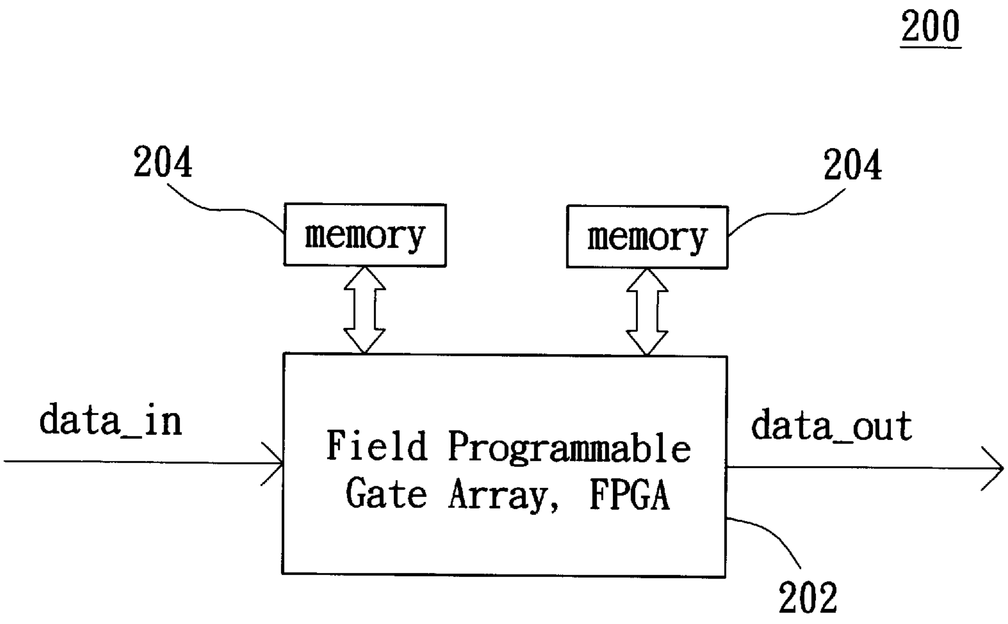
FIG. 2 (PRIOR ART)
FIG. 2 is a block diagram of the conventional device for compensating luminance.
Figure 3:
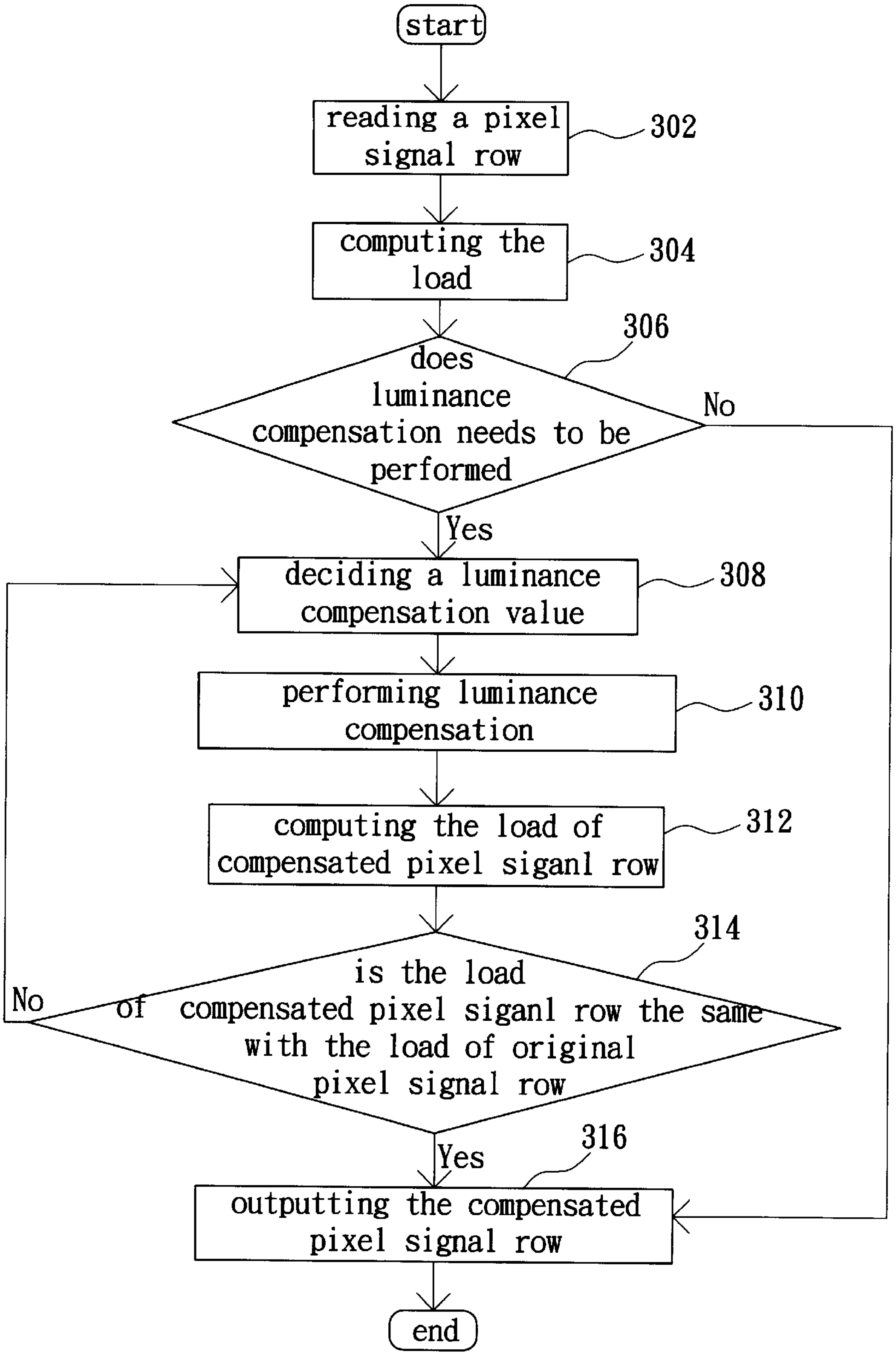
FIG. 3 (PRIOR ART)
FIG. 3 is a flow chart of the conventional method for compensating luminance.
Figure 4:
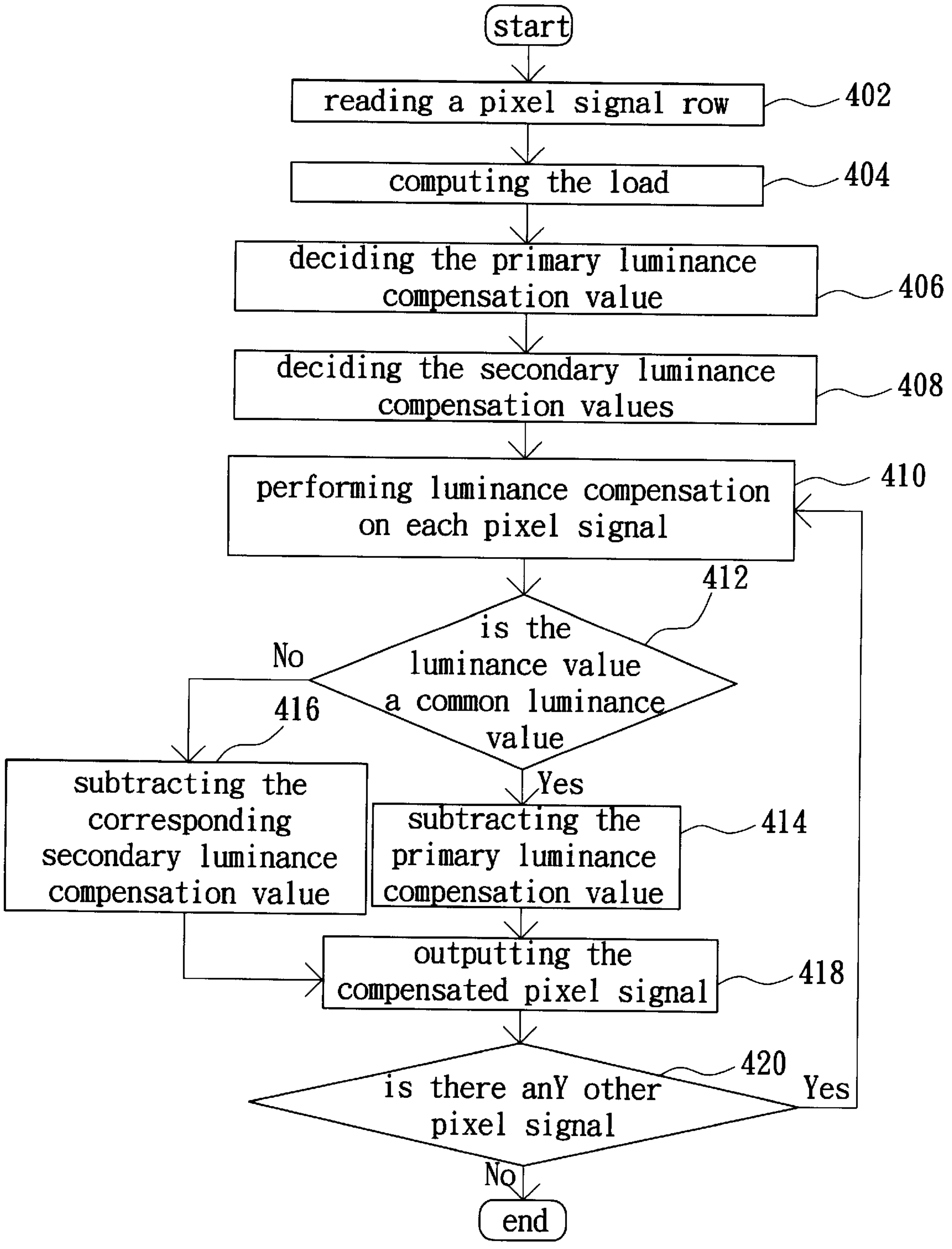
FIG. 4 is a flow chart of the method for compensating luminance used in a plasma display panel, according to a preferred embodiment of the present invention.

Referring to FIG. 4, it is a flow chart of the method for compensating luminance used in a plasma display panel, according to a preferred embodiment of the present invention. If a plasma display panel with a resolution of 800×600 is taken as an example, each pixel row has 800 pixels, and each pixel receives three pixel signals for displaying red, blue, and green respectively. Therefore, there are 2400 pixel signals in a pixel signal row. Each pixel signal includes a luminance value.

At first, in the step 402, the device for compensating luminance reads all 2400 pixel signals of a pixel signal row at a time. After that, in the step 404, the load of the pixel signal row is computed. The method for computing the load of the pixel signal row is the same with the conventional method. What should be noted is that the panel characteristic of each plasma display panel cannot be exactly the same. Therefore, if the same pixel signal row is input to two different plasma display panels, the degree of the loading effect in these two panels can be different. In order to achieve the better effect of luminance compensation, the magnitude of threshold luminance value should be adjusted according to the difference of the panel characteristic of each plasma display panel.

Then, in the following step 406, a primary luminance compensation value is decided according to the load of the pixel signal row. Referring to FIG. 5, it is a look-up-table (LUT) of the relation between the load of the pixel signal row and the corresponding primary luminance compensation values. In the present invention, the relation between the load of the pixel signal row and the corresponding primary luminance compensation values is predetermined and stored in the form of the look-up-table in the device for compensating luminance. The primary luminance compensation value is decided by looking up the look-up-table for luminance compensation. The difference from the conventional method is that the present invention includes a number of primary luminance compensation values and each primary luminance compensation value is corresponded to the load of the pixel signal row respectively, as shown in FIG. 5. Therefore, different luminance compensation values are used according to the load of the pixel signal row. According to the forgoing descriptions, the relation between the load of the pixel signal row and the primary luminance compensation value may be different due to the different panel characteristic of each plasma display panel.

The luminance compensation method of the present invention is that the luminance value of each pixel signal is subtracted by the luminance compensation value. After performing luminance compensation, the difference among the luminance value of all pixel signals in the pixel signal row is unchanged and the luminance value of each pixel signal in the compensated pixel signal row is less than the luminance value of each pixel signal in the original pixel signal row. Therefore, the degree of the loading effect of the pixel row which displays according to the compensated pixel signal row is less than which displays according to the original pixel signal row. In other words, the difference between the actual luminance and the expected luminance of the pixel is less. And the luminance difference of the pixels which display according to the corresponding pixel signal respectively is still maintained after performing luminance compensation. Besides, luminance compensation can still be performed if there is one pixel signal which has the largest luminance value 255.

If the load of the pixel signal row is larger, the degree of the loading effect is larger and the difference between the actual luminance and the expected luminance of the pixel is also larger. When performing luminance compensation, the primary luminance compensation value will be larger if the load of the pixel signal row is less and the primary luminance compensation value will be less if the load of the pixel signal row is larger, as shown in FIG. 5. But the relation between the load of the pixel signal row and the primary luminance compensation value is not exactly inverse proportional. It should be adjusted according to the panel characteristic of each plasma display panel.

When luminance compensation is performed according to the method introduced by the present invention, the luminance value of each pixel signal is subtracted by the primary luminance compensation value. However, there are some pixel signals that the luminance value of these pixel signals is so small that the luminance value can down to 0 or near 0 if luminance compensation is performed. The displaying performance of the panel is affected in this situation. In the present invention, a low threshold luminance value is predetermined and stored in the device for compensating luminance, so as to determine whether the luminance value of each pixel signal is common luminance value or the low luminance value. In this preferred embodiment of the present invention, the magnitude of the low threshold luminance value is predetermined to be 100. The luminance value of the pixel signal larger than or equal to 100 is considered to be the common luminance value and the luminance value of the pixel signal less than 100 is considered to be the low luminance value. In order to achieve luminance compensation without affecting displaying performance of the panel, the luminance compensation value for the low luminance value of the pixel signal is considered specifically in the present invention.

In the following step 408, after the primary luminance compensation value is decided, a number of secondary luminance compensation value are decided according to the magnitude of the primary luminance compensation value. FIG. 6 is a predetermined look-up-table of the relation between the pixel signal and the corresponding secondary luminance compensation values when the primary luminance compensation value is 10. The relation between the primary luminance compensation value and the number of secondary luminance compensation values is predetermined and stored in the form of look-up-table (LUT) in the device of compensating luminance. The corresponding secondary luminance compensation values are decided by looking up the look-up-table when luminance compensation is performed.

In the present invention, the low luminance values are divided into a number of low luminance value group and each low luminance value group is corresponded to a specific secondary luminance compensation value. In order to maintain luminance continuity of the panel, if the magnitude of the low luminance value group is closer to the low threshold luminance value, the corresponding secondary luminance compensation value is closer to the primary luminance compensation value and if the magnitude of the low luminance value group is less, the corresponding secondary luminance compensation value is less. For example, as shown in FIG. 6, the magnitude of the low threshold luminance value is predetermined to be 100 and the primary luminance compensation value is 10, the secondary luminance compensation value of the low luminance value group 90~100 is 9, the secondary luminance compensation value of the low luminance value group 80~90 is 8 . . . , etc. If the luminance value of the pixel signal is less than 10, the corresponding secondary luminance compensation value is set to be 0, which means that luminance compensation will not be performed on this kind of small luminance values. In this manner, the full dark luminance can be displayed and the luminance contrast is maintained. Therefore, the displaying performance of the panel can be still maintained after luminance compensation is performed.

FIG. 7 is a predetermined look-up-table of the relation between the pixel signal and the corresponding secondary luminance compensation values when the primary luminance compensation value is 20. The relation between each low luminance value group and the corresponding secondary luminance compensation value is predetermined according to the magnitude of the primary luminance compensation value. In FIG. 7, the primary luminance compensation value is 20, different form FIG. 6. Therefore, the relation between each low luminance value group and the corresponding secondary luminance compensation value is different form the relation shown in FIG. 6. And the relation between each low luminance value group and the corresponding secondary luminance compensation value is not exactly linear proportional. It should be adjusted according to the panel characteristic of each plasma display panel.

After the corresponding secondary luminance compensation values are decided, the following step 410 is performed, in which each pixel signal in the pixel signal row is sequentially read out to perform luminance compensation. After that, the following step 412 is performed. The luminance value of each pixel signal is determined to be the common luminance value and the low luminance value. If the luminance value of the pixel signal is larger than or equal to the low threshold luminance value, it is considered to be the common luminance value. If the luminance value of the pixel signal is less than the low threshold luminance value, it is considered to be the low luminance value. If the luminance value of the pixel signal is considered to be the common luminance value, the step 414 is performed, in which the luminance value of the pixel signal is subtracted by the primary luminance compensation value. If the luminance value of the pixel signal is considered to be the low luminance value, the step 416 is performed, in which the luminance value of the pixel signal is subtracted by the corresponding secondary luminance compensation value according to the magnitude of the low luminance value. After luminance compensation is performed, the following step 418 is performed, in which the compensated pixel signal is outputted. In the step 420, the device for compensating luminance performs luminance compensation on the luminance value of all other pixel signals in the pixel signal row in turn until all pixel signals of the pixel signal row are performed luminance compensation and outputted. Thus, it means that the device for compensating luminance has accomplished luminance compensation.

The method for compensating luminance of the plasma display panel has the following advantages. First, the magnitude of the primary luminance compensation value is determined according to the load of the pixel signal row and the secondary luminance compensation values are determined according to the primary luminance compensation value. The corresponding relation between the load of the pixel signal row and the primary luminance compensation value and the corresponding relation between the primary luminance compensation value and the secondary luminance compensation values can be adjusted according to the panel characteristic of the plasma display panel. In this manner, the effect of luminance compensation is much better than the conventional method, in which the luminance compensation values stored in the look-up-table are all fixed and cannot be adjusted according to the load of the pixel signal row and the panel characteristic of the plasma display panel. Second, in the present invention, luminance compensation is performed by subtracting the corresponding luminance compensation value from luminance value of the pixel signal. Therefore, if the luminance value of the pixel signal is the largest luminance value 255 or $(10011111)_2$ in the pixel signal row, luminance compensation can still be performed. Third, in the present invention, the low luminance values are specifically considered to determine the corresponding luminance compensation values. Therefore, the full black luminance can be displayed and the luminance contrast of the panel is maintained after luminance compensation is performed. In other words, the displaying performance of the panel is not affected when luminance compensation is performed.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method applicable in a plasma display panel for compensating luminance of a pixel signal row, said pixel signal row including a plurality of pixel signals and each of said pixel signal including a luminance value, said method comprising:

reading said luminance values of said pixel signals for said pixel signal row;

computing a load of said pixel signal row, said load is a count of said pixel signals comprising a luminance value being larger than or equal to a predetermined threshold luminance value;

deciding a primary luminance compensation value of said pixel signal row according to said load of said pixel signal row;

deciding a plurality of secondary luminance compensation values of said pixel signal row according to said primary luminance compensation value;

performing luminance compensation subtracting a primary luminance compensation value from said luminance value of said pixel signal in the case of said luminance value being larger than or equal to a low threshold luminance value and by subtracting a secondary luminance compensation value from said luminance value of said pixel signal in the case of said luminance value being smaller than said low threshold luminance value; and outputting said pixel signal row.

2. The method for compensating luminance according to claim 1, a look-up-table (LUT) which is composed of a plurality of primary luminance compensation values is stored in the plasma display panel, wherein the primary luminance compensation value is decided by looking up the look-up-table.

3. The method for compensating luminance according to claim 1, wherein a look-up-table (LUT) which is composed of a plurality of secondary luminance compensation values is stored in the plasma display panel and the secondary luminance compensation values are decided by looking up the look-up-table.

4. The method for compensating luminance according to claim 1, wherein each of said pixel signal comprising a luminance value being less than a low threshold luminance value is corresponded to one of said secondary luminance compensation values stored in a look-up-table.

5. The method for compensating luminance according to claim 1, wherein the smaller of said load, the larger of said corresponding primary luminance compensation value.

6. The method for compensating luminance according to claim 1, wherein the larger of said luminance value being smaller than said low threshold luminance value, the larger of said corresponding secondary luminance compensation value.

7. A device applicable in a plasma display panel for compensating luminance of a pixel signal row, said pixel signal row including a plurality of pixel signals with a respective luminance value, the device comprising:

a data reading device for reading said luminance values of said pixel signals for said pixel signal row;

a load computation device coupled to said data reading device for computing a load of said pixel signal row, wherein said load of said pixel signal row is a count of said pixel signals comprising a luminance value being larger than a predetermined threshold luminance value;

a primary deciding device coupled to said load computation device for deciding a primary luminance compensation value according to said load of said pixel signal row;

a secondary deciding device coupled to said primary deciding device for deciding a plurality of secondary luminance compensation values according to said primary luminance compensation value, each of said pixel signal comprising a luminance value being less than a low threshold luminance value is corresponded to one of said secondary luminance compensation values;

a pixel compensating device coupled to said secondary deciding device to perform luminance compensation of said pixel signals by subtracting a primary luminance compensation value from said luminance values of said pixel signals in the case of said luminance value being larger than or equal to a low threshold luminance value and by subtracting a secondary luminance compensation value from said luminance value of said pixel signal in the case of said luminance value being less than said low threshold luminance value; and an output device coupled to said pixel compensating device for outputting said pixel signal row after luminance compensation is completed.

* * * * *